United States Patent
Suzuki

(10) Patent No.: US 7,499,451 B2
(45) Date of Patent: Mar. 3, 2009

(54) COMPUTER NODE, CLUSTER SYSTEM, CLUSTER MANAGING METHOD, AND CLUSTER MANAGING PROGRAM

(75) Inventor: Kazuhiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 668 days.

(21) Appl. No.: 11/134,822

(22) Filed: May 20, 2005

(65) Prior Publication Data
US 2005/0207421 A1    Sep. 22, 2005

Related U.S. Application Data

(63) Continuation of application No. PCT/JP2004/001882, filed on Feb. 19, 2004.

(30) Foreign Application Priority Data
Feb. 20, 2003    (JP)    ............... 2003-042104

(51) Int. Cl.
*H04L 12/28*    (2006.01)
(52) U.S. Cl. .................. 370/392; 370/469; 709/238
(58) Field of Classification Search ................ 370/255, 370/389, 392, 395, 54; 709/238, 242, 245
See application file for complete search history.

(56) References Cited

U.S. PATENT DOCUMENTS

| | | | |
|---|---|---|---|
| 6,272,113 B1 * | 8/2001 | McIntyre et al. ............ | 370/248 |
| 6,804,247 B1 * | 10/2004 | Sasyan et al. ............... | 370/397 |
| 7,136,383 B1 * | 11/2006 | Wilson ....................... | 370/392 |
| 2005/0141499 A1 * | 6/2005 | Ma et al. .................... | 370/389 |
| 2007/0088822 A1 * | 4/2007 | Coile et al. ................. | 709/224 |
| 2008/0010342 A1 * | 1/2008 | Gebhardt et al. ........... | 709/204 |

FOREIGN PATENT DOCUMENTS

| | | |
|---|---|---|
| JP | 11-341042 | 12/1999 |
| JP | 2000-187632 | 7/2000 |
| JP | 2002-259354 | 9/2002 |

OTHER PUBLICATIONS

Guerney D. H. Hunt et al, "Network Dispatcher: a connection router for scalable Internet services", Computer Networks and ISDN Systems 30 (1998) pp. 347-357.
O.P. Damani, "ONE-IP: Techniques for Hosting a Service on a Cluster of Machines", Proc. 6th International WWW Conference, 1997.
Linux Ha "Turbolinux Cluster Service 6", Feb. 3, 2001, pp. 11-12, 35-51, 116-120.

* cited by examiner

*Primary Examiner*—Ricky Ngo
*Assistant Examiner*—Kan Yuen
(74) *Attorney, Agent, or Firm*—Greer, Burns & Crain, Ltd.

(57) ABSTRACT

A cluster system 1 for providing a plurality of virtual computer nodes to a client 5 has real nodes 3a, 3b and 3c for executing an application, and a coordinator node 2 for assigning the real IP address that is the IP address of the real node with the IP address of the virtual computer node, and the real nodes 3a, 3b and 3c and the coordinator node 2 store the IP management table of a corresponding table of the virtual IP address and the real IP address, and perform communication using the virtual IP address based on the IP management table.

8 Claims, 7 Drawing Sheets

IP MANAGEMENT TABLE IN rsh MODE

| V I P # 1 | R I P # a |
|---|---|
| . . . | . . . |

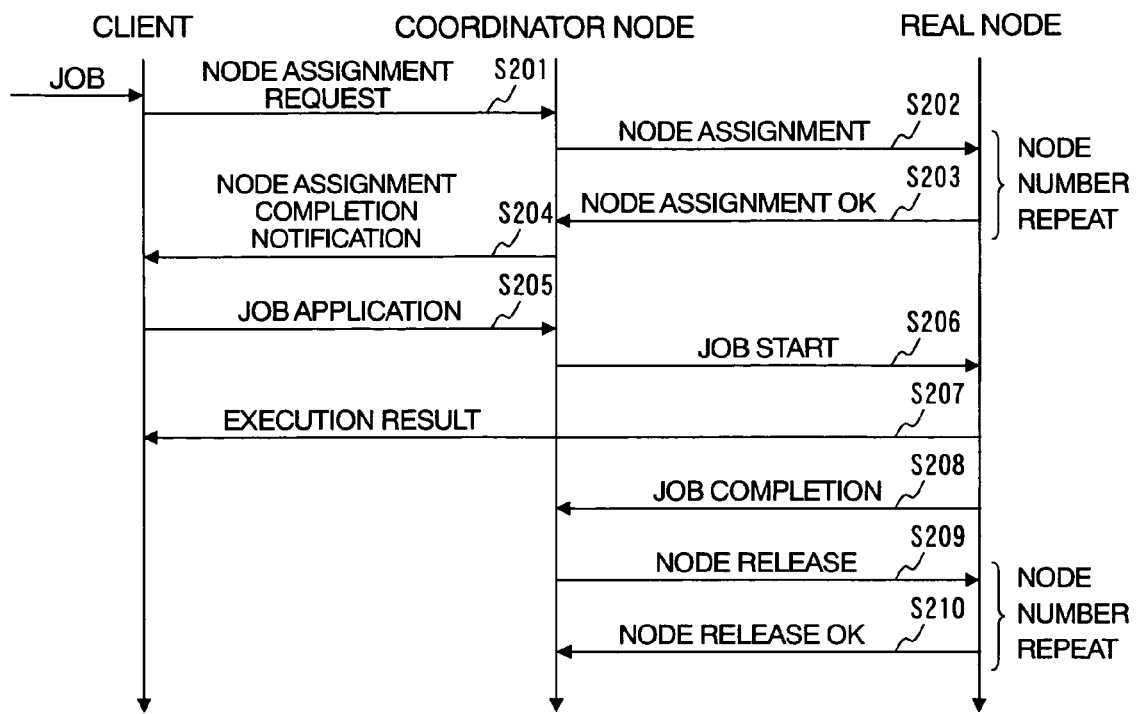

FIG. 12
IP MANAGEMENT TABLE IN WWW MODE
| V I P # 1 | R I P # a |
|---|---|
| V I P # 1 | R I P # b |
| V I P # 1 | R I P # c |
| ⋮ | ⋮ |
FIG. 13
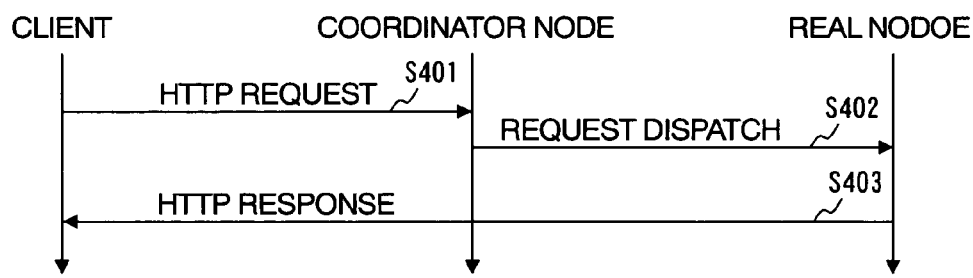
FIG. 14
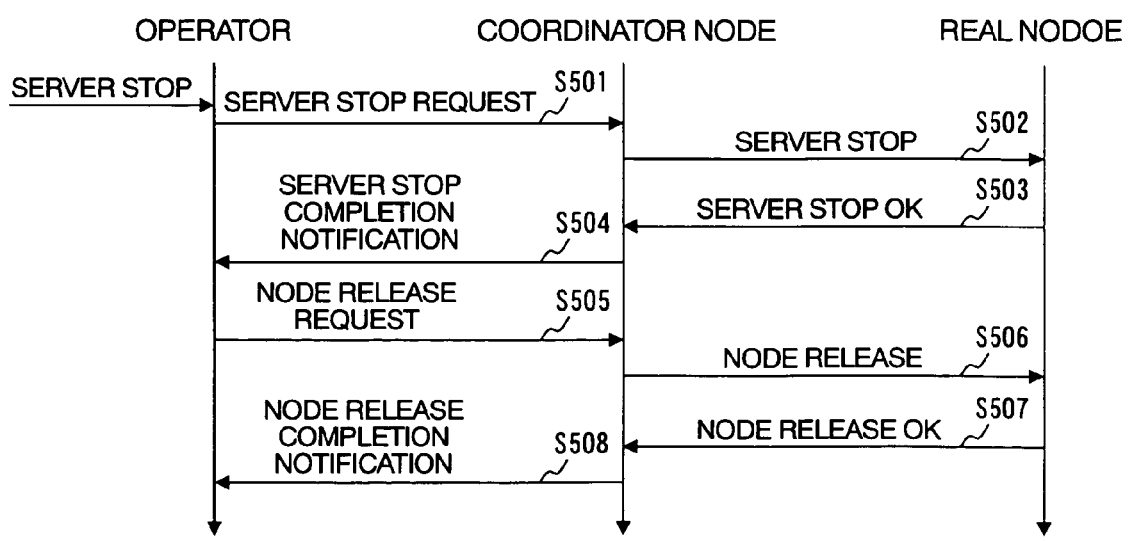

COMPUTER NODE, CLUSTER SYSTEM, CLUSTER MANAGING METHOD, AND CLUSTER MANAGING PROGRAM

This is a continuation of International PCT Application No. PCT/JP2004/001882 filed Feb. 19, 2004.

TECHNICAL FIELD

The present invention relates to a computer node, a cluster system, a cluster managing method and a cluster managing program which can flexibly correspond to a change of a structure, such as a node failure in a cluster system for making a computer on a network as a node and operating a plurality of nodes as one system.

BACKGROUND ART

A cluster system is a system that improves processing capability and reliability that have been limited in a single node, by operating a plurality of nodes to execute a process of the same working purpose. Generally, as a cluster system, there are three types of a failover type, a load balance type and an HPC (High Performance Computing) type.

First, the failover type will be described. In the failover type, two or more nodes are operated. If the operation becomes impossible due to a certain cause, other node that was on standby takes over its process, thereby improving HA (High Availability).

Then, the load balance type will be described. In the load balance type, a server, such as a WWW (World Wide Web), an FTP (File Transfer Protocol) server, etc., are multiplexed, realizing scalability. More particularly, a session of an IP level to one load balancer is assigned to a plurality of standby service nodes. Thus, a load on one node is dispersed. There are several methods for allocating, however, a structure, such as a round robin type for sequentially assigning a process, a dynamic load balancer for assigning the process to a service node having a small load while monitoring a load of the network traffic, or the like is often used.

Next, the HPC type will be described. In the HPC type, a parallel process application is performed at high speed by operating a plurality of nodes in cooperation. If data transfer band of interconnection between the nodes is narrow, it becomes a bottleneck to lower the entire processing capability. Therefore, a high-speed interface such as giga bit Ethernet or Myrinet may be connected. There are libraries, such as an MPI (Message Passing Interface), a PVM (Parallel Virtual Machine), etc. to form the parallel process application. They are utilized in an academic study field in conjunction with a numeric value calculation library.

However, in the above-mentioned cluster system, a user application is performed directly on the node. Therefore, there is a problem that the user application cannot flexibly deal with a node failure or a change of a structure. Therefore, for example, it has been necessary to deal with a node failure or the like for each user application.

In view of the above-mentioned problems, the present invention has been made to provide a computer node, a cluster system, a cluster managing method and a cluster managing program which can deal flexibly with a change of a structure, such as a node failure, without changing the user application, by concealing and virtualizing the node so as not to directly operate the node in a cluster system of the user application.

DISCLOSURE OF THE INVENTION

To solve the above-mentioned subject, the present invention provides a computer node that is a physical computer node in a cluster system for providing at least one virtual computer node for a client, comprising: an IP layer for storing an IP management table of a corresponding table of a virtual IP address that is an IP address of the virtual computer node and a real IP address that is an IP address of the physical computer node, and performing communication using the virtual IP address based on the IP management table; and a network device connected to other computer node and the client through a network.

According to the above structure, since the computer node of the cluster system comprises the common IP management table, communication using the virtual IP address in the cluster system can be achieved.

The computer node according to the present invention, further comprises an application executing unit for executing an application designated from the client.

According to the above structure, the cluster system having high availability can be provided by concealing the computer node for performing the application from a client and dynamically assigning as a virtual computer node.

In the computer node according to the present invention, the IP layer includes: a encapsulating unit for retrieving a real IP address corresponding to a virtual IP address of a destination by using the IP management table when a first packet added with a first IP header with the virtual IP address as a destination from the application executing unit is inputted, encapsulating to further add a second IP header with the retrieved real IP address as a destination to the first packet, and outputting the obtained second packet to the network device; and a decapsulating unit for generating a fourth packet by removing a third IP header from a third IP packet when the third packet added with the third IP header with the real IP address as a destination from the network device is inputted, and outputting the obtained fourth packet to the application executing unit when the virtual IP address of the fourth IP header with the virtual IP address as a destination is the virtual IP address of the own computer node.

According to the above structure, the computer node can realize communication between the virtual computer nodes by converting the virtual IP address and the real IP address in accordance with a common IP management table.

The computer node according to the present invention includes a tunnel device handled similarly to the network device for outputting the packet with the virtual IP address of the own computer node as a destination to the IP layer.

According to the above structure, the IP layer can process the packet with the virtual IP address as a destination similarly to the packet having the real IP address as a destination.

The computer node according to the present invention further includes: a load state detector for detecting a load state of other computer node; a node assigning unit for assigning the real IP address to the virtual IP address based on the load state to form the IP management table; and a broadcasting unit for broadcasting the IP management table to other computer node, wherein the IP layer includes: a virtual node providing unit for providing the virtual address to the client; and a packet allocating unit for retrieving the real IP address from the virtual IP address by using the IP management table when the packet with the virtual IP address as a destination is inputted from the network device, and outputting the packet with the retrieved real IP address as a destination to the network device.

According to the above structure, in the cluster system, the virtual IP address is assigned to the real IP address in response to a load state, a failure, etc. of other computer node. Therefore, the client can deal flexibly with the change of the load of the computer node or the failure of the computer node without changing the IP address of the computer node, realizing high availability.

In the computer node according to the present invention, the packet allocating unit further encapsulates the second IP header with the retrieved real IP address as a destination to the first packet when the first packet added with the first IP header with the virtual IP address as a destination is inputted from the network device, and outputs the obtained second packet to the network device.

According to the above structure, the computer node can realize communication to the virtual computer node by converting the virtual IP address and the real IP address in accordance with the common IP management table.

In the computer node according to the present invention, the virtual node providing unit assigns at least one IP address different from the real IP address to the network device.

According to the above structure, a request to a plurality of virtual nodes is accepted, and can be assigned to the physical computer node.

In the computer node according to the present invention, the node assigning unit assigns a plurality of real IP addresses to one virtual IP address.

According to the above structure, the load balance type cluster system can be constructed by using the virtual computer node.

In the computer node according to the present invention, the node allocating unit changes the real IP address for transferring the request each time the one virtual IP address receives a request from the client.

According to the above structure, even when a large amount of requests are made from the client to the virtual computer node, a load of the physical computer node can be dispersed.

In the computer node according to the present invention, the broadcasting unit broadcasts only changed entry of the IP management table to other computer node.

According to the above structure, an amount of transfer of data regarding the IP management table can be reduced.

In the computer node according to the present invention, the broadcasting unit transmits only the entry requested from the other computer node of the IP management table only to the other computer node.

According to the above structure, an amount of transfer of data regarding the IP management table can be reduced.

The present invention provides a cluster system for providing a plurality of virtual computer nodes to a client, comprising at least one real node that is the computer node according to claim 2 for executing an application, and at least one coordinator node that is the computer node according to claim 5 for assigning the virtual IP address to the real IP address of the real node.

According to the above structure, the coordinator node assigns the virtual IP address to the real IP address in response to a load state, a failure, etc., of the real node. Therefore, the client can deal flexibly with the change of the load of the node or the failure of the node without changing the IP address of the real node, realizing high availability.

In the cluster system according to the present invention, the coordinator node transmits the IP management table to the real node, and the real node transmits the reception of the IP management table to the coordinator node.

According to the above structure, the coordinator node can deliver certainly the IP management table to the real node.

The present invention provides a cluster managing method for providing at least one virtual computer node for a client, and managing at least one real node of the computer node for actually executing the application designated from the client, comprising: a step that is connected to the real node and the client through the network; a step that provides a virtual IP address that is the IP address of the virtual computer node to the client; a step that detects a load state of the real node; a step that assigns the real IP address that is the IP address of the real node to the virtual IP address based on the load state to form the IP management table; a step that broadcasts the IP management table to the real node; and a step that retrieves the real IP address from the virtual IP address by using the IP management table when the packet with the virtual IP address as a destination is inputted from the client through the network, and outputs the packet with the retrieved real IP address as a destination to the real node of the destination through the network.

According the above structure, the coordinator node assigns the virtual IP address to the real IP address in response to a load state, a failure, etc., of the real node. Therefore, the client can deal flexibly with the change of the load of the node or the failure of the node, realizing high availability.

The present invention provides a cluster managing program stored in a medium readable by the computer for providing at least one virtual computer node to a client, and managing at least one real node of a computer node for actually executing an application designated from the client making a computer to execute: a step that is connected to the real node and the client through the network; a step that provides a virtual IP address that is the IP address of the virtual computer node to the client; a step that detects a load state of the real node; a step that assigns the real IP address that is the IP address of the real node to the virtual IP address based on the load state to form the IP management table; a step that broadcasts the IP management table to the real node; and a step that retrieves the real IP address from the virtual IP address by using the IP management table when the packet with the virtual IP address as a destination is inputted from the client through the network, and outputs the packet with the retrieved real IP address as a destination to the real node of the destination through the network.

According to the above structure, the coordinator node assigns the virtual IP address to the real IP address in response to a load state a failure, etc., of the real node. Therefore, the client can deal flexibly with the change of the load of the node or the failure of the node, realizing high availability.

Incidentally, in the present invention, a medium readable by the computer includes a portable storage medium, such as a CD-ROM, a flexible disk, a DVD disk, a magneto-optical disk, an IC card and the like, a database for holding a computer program, or other computer as well as its database, and further a transmission medium in a channel.

BRIEF DESCRIPTION OF THE DRAWINGS

FIG. 8 is a sequence diagram showing one example of an operation in HPC mode of a cluster system according to the embodiment;

FIG. 9 is a view showing one example of the IP management table in the HPC mode;

FIG. 12 is a view showing one example of the IP management table in the WWW mode;

FIG. 13 is a sequence diagram showing one example of an operation at a service providing time in the WWW mode of the cluster system according to the embodiment; and FIG. 14 is a sequence diagram showing one example of an operation of stopping a server in the WWW mode of the cluster system according to the embodiment.

BEST MODE FOR CARRYING OUT THE INVENTION

Embodiments of the present invention will be described with reference to the accompanying drawings.

First Embodiment

In this embodiment, the case that a cluster system of the present invention is used in rsh (remote shell) mode will be described. In the rsh mode, an execution of one application is performed in one real node.

Figure 1:
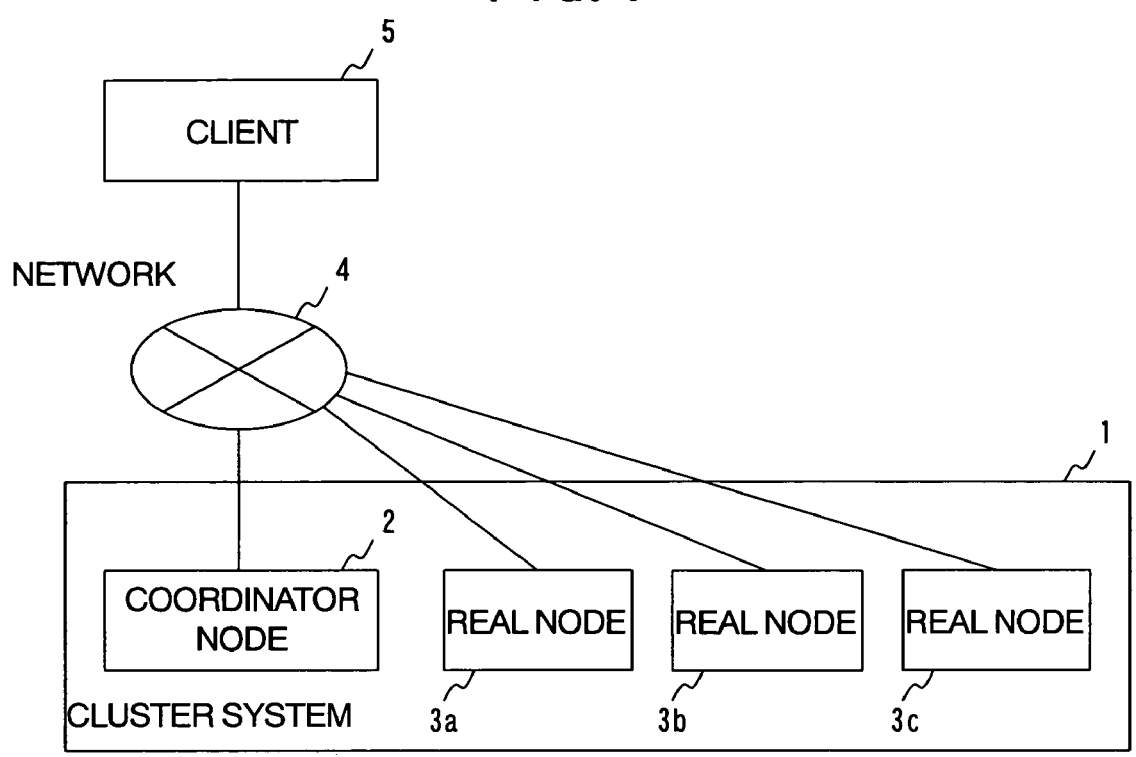
FIG. 1 is a block diagram showing one example of a structure of a cluster system according to an embodiment.

First, the configuration of the cluster system according to this embodiment will be described with reference to FIG. 1. FIG. 1 is a block diagram showing one example of a configuration of the cluster system according to this embodiment. As shown in FIG. 1, the cluster system 1 according to this embodiment includes a coordinator node 2, and real nodes 3a, 3b, and 3c. The respective nodes are connected to each other through a network 4, and connected to a client 5 through the network 4.

The cluster system according to this embodiment inhibits the cluster in the user application to directly operate the node. This is realized by providing only the virtual node of a virtual computer node for the client 5, and concealing a real node that is the physical computer node for executing actually the application. The coordinator node is a computer node for assigning the real node with the virtual node and an execution of the application in response to a request from a client, a load state of the real node, etc. The real node actually executes the application according to the assignment of the coordinator node. When the application is finished, the real node is released, and the assignment of the virtual node and the execution of the application are cancelled.

Figure 2:
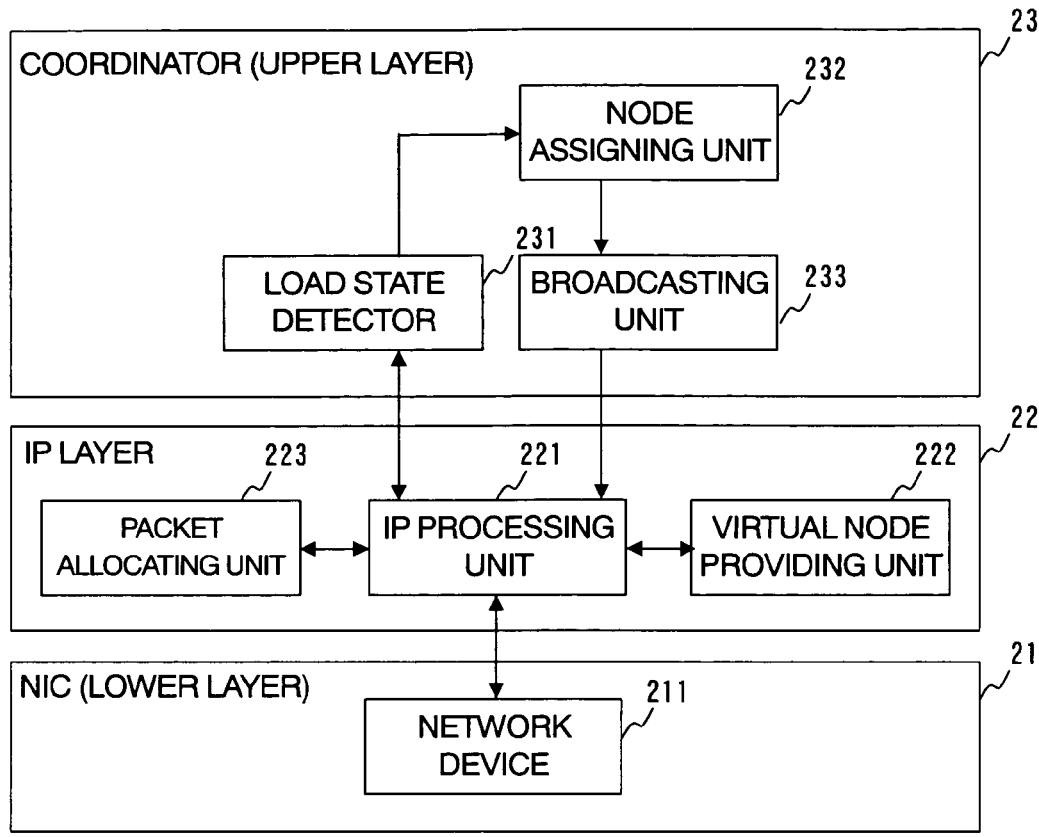
FIG. 2 is a block diagram showing one example of a function of a coordinator node according to the embodiment.

Next, a function of the coordinator node according to this embodiment will be described by using FIG. 2. FIG. 2 is a block diagram showing one example of a function of the coordinator node according to this embodiment. As shown in FIG. 2, the coordinator node 2 according to this embodiment mainly is composed of, by paying notice to the IP layer in a hierarchical model, an NIC 21 (Network Interface Card) belonging to a lower layer, an IP (Internet Protocol) layer 22 and a coordinator 23 belonging to an upper layer. The NIC 21 includes a network device 211. The IP layer 22 includes an IP processing unit 221, a virtual node providing unit 222, and a packet allocating unit 223. The coordinator 23 includes a load state detector 231, a node assigning unit 232, and a broadcasting unit 233.

Then, an operation of the coordinator node according to this embodiment will be described. The load state detector 231 detects load states of the respective real nodes 3a, 3b and 3c. The load state shows which process is operated at how usage rate of a CPU at present.

The node assigning unit 232 sets a virtual IP address (VIP) that is the virtual IP address in the IP management table. When a node assignment request from outside is accepted, the unit 232 assigns the VIP to the real IP address (RIP) that is the actual IP address of the real node based on the load states of the respective real nodes 3a, 3b and 3c, and generates the IP management table. Also, the unit 232 updates the IP management table, as needed. The IP management table is a corresponding table for retrieving the RIP from the VIP.

When the IP management table is updated, the broadcasting unit 233 broadcasts the IP management table to all the real nodes 3a, 3b and 3c. Here, as an example, the IP management table is broadcasted only at the IP management table updating time. However, only an entry changed in the IP management table may be broadcast. Alternatively, an entry requested from the real node in the IP management table may be transmitted. Further, the coordinator node 2 confirms whether the IP management table is arrived without fail or not. To this end, the real node may return the information showing that the real node receives the IP management table to the coordinator node 2.

The virtual node providing unit 222 provides the VIP set to the IP management table as the virtual node for the client 5. To allow the VIP to be seen by the client 5, a plurality of VIPs are assigned to the one network device 211.

The IP processing unit 221 performs filtering or routing of the IP packet inputted from the upper layer or the lower layer, similarly to the conventional IP layer. In the case where the IP packet is inputted from the network device 211, and if the IP packet is directed to the own node, the IP packet is delivered to the upper layer. If the IP packet is not directed to the own node, the IP packet is again outputted to the network device 211 to be transferred to the appropriate network. On the contrary, when the IP packet is inputted from the upper layer, the IP packet is outputted to the network device 211 to be transmitted to the appropriate network. Further, when the IP packet having the VIP header is inputted from the network device 211, the IP processing unit 221 outputs the IP packet to the packet allocating unit 223. Here, the IP header having the RIP as a destination, is called an RIP header, and IP header having the VIP as a destination, is called a VIP header.

Figure 3A:
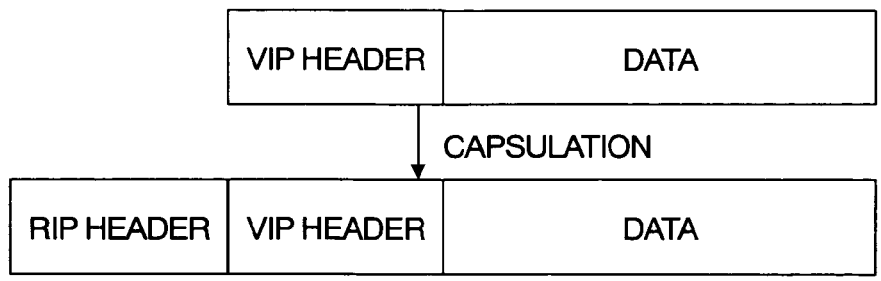
FIG. 3 is a view showing one example of an operation of capsulation and decapsulation.

The packet allocating unit 223 processes the IP packet arrived at the VIP provided by the virtual node providing unit 222. First, when the IP packet having the VIP header is inputted from the IP processing unit 221, the packet allocating unit 223 retrieves the RIP from the VIP by using the IP management table, and obtains the RIP of the destination real node for actually transmitting the packet. Then, the packet allocating unit 223 further adds, as shown in FIG. 3(a), the RIP header to the IP packet having the VIP header, thereby encapsulating the IP packet. The encapsulated IP packet is outputted to the IP processing unit 221, and is further transmitted to the external RIP through the network device 211.

The network device 211 is connected to the external client 5 and the respective nodes through the network 4. The packet received from the outside is outputted to the IP processing unit 221, as well as, the packet inputted from the IP processing unit 221 is transmitted to the outside.

Next, mounting example of the IP processing unit 221 that is the IP layer and the packet allocating unit 223 will be described. First, mounting example of the virtual node providing unit 222 will be described. Here, a mechanism called an IP alias is used. The IP alias is standard supported by a Linux kernel, and other IP address can be assigned by a command "# ifconfig eth0:0 192.168.1.100". When numeral characters after ":" is changed, a plurality of IP addresses can be assigned. The VIP is assigned by using this function.

Figure 4:
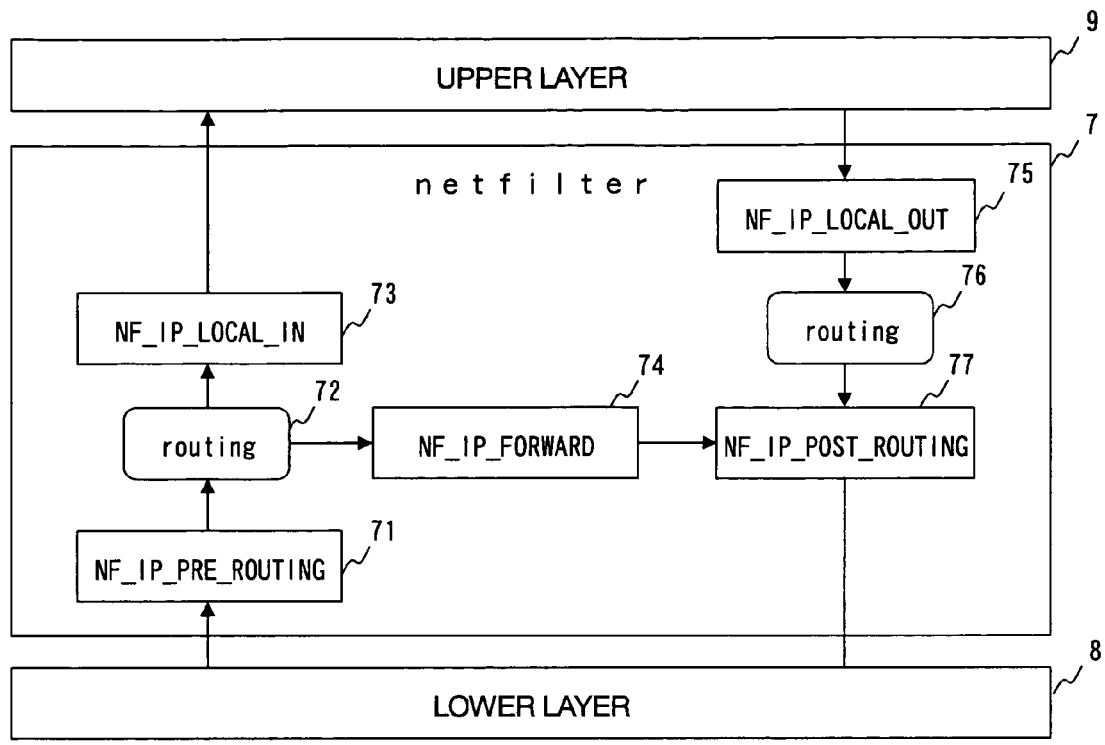
FIG. 4 is a block diagram showing one example of mounting an IP layer.

Then, the mounting example of the IP processing unit 221 and the packet allocating unit 223 will be described. FIG. 4 is a block diagram showing one example of the mounting of the IP layer. A mechanism of the packet filtering is incorporated in the Linux kernel 2.4. This is called a netfilter. The netfilter is a framework for providing the expandability of a code for performing the IP packet process in the kernel. Here, the IP processing unit 221 is realized by using the function of the netfilter in the IP layer of the Linux. The netfilter 7 is connected to the lower layer 8 and the upper layer 9.

Here, a concrete operation of the conventional netfilter will be described. The packet received by the lower layer 8 is transmitted to a routing 72 through an NF_IP_PRE_ROUTING 71. If the packet is a packet transferred to other node, the packet is transmitted to an NF_IF_FORWARD 74. If not, the packet is transmitted to NF_IP_LOCAL_IN 73. The IP packet transmitted to the NF_IF_FORWARD 74 is transmitted to the lower layer 8 through an NF_IP_POST_ROUTING 77, and then transmitted to the other node. On the other hand, the packet transmitted to the NF_IP_LOCAL_IN 73 is transmitted the upper layer 9.

The IP packet from the upper layer 9 is transmitted to the routing 76 through an NF_IP_LOCAL_OUT 75. Further, the IP packet is transmitted to the lower layer 8 through the NF_IP_POST_ROUTING 77, and then transmitted to the other node. The IP processing unit 221 is realized by the above-mentioned netfilter 7.

The packet allocating unit 223 can be realized by expanding the function of the netfilter described with reference to FIG. 4. The netfilter 7 provides a mechanism for calling a hook function respectively, in the parts of the NF_IP_PRE_ROUTING 71, the NF_IP_LOCAL_IN 73, the NF_IP_FORWARD 74, the NF_IP_LOCAL_OUT 75, and the NF_IP_POST_ROUTING 77. Lists for registering the functions are prepared for these parts, and can be registered by an interface of "int nf_register hook(struct nf_hook_ops *reg)", and can be deleted by an interface of "int nf_unregister_hook(struct nf_hook_ops *reg)". Here, a structure of the struct nf hook ops type is to register the hook function. In this embodiment, an operation of the packet allocating unit 223 is registered as the hook function with the NF_IP_LOCAL_IN 73. Thus, the packet allocating unit 223 can be realized.

Furthermore, the encapsulation in the packet allocating unit 223 can be mounted by applying an IP tunneling function. A protocol of the IP packet directed to the RIP is set to an IP PROTO IPIP. This is called IP tunneling protocol, which shows the encapsulation of the packet.

Figure 5:
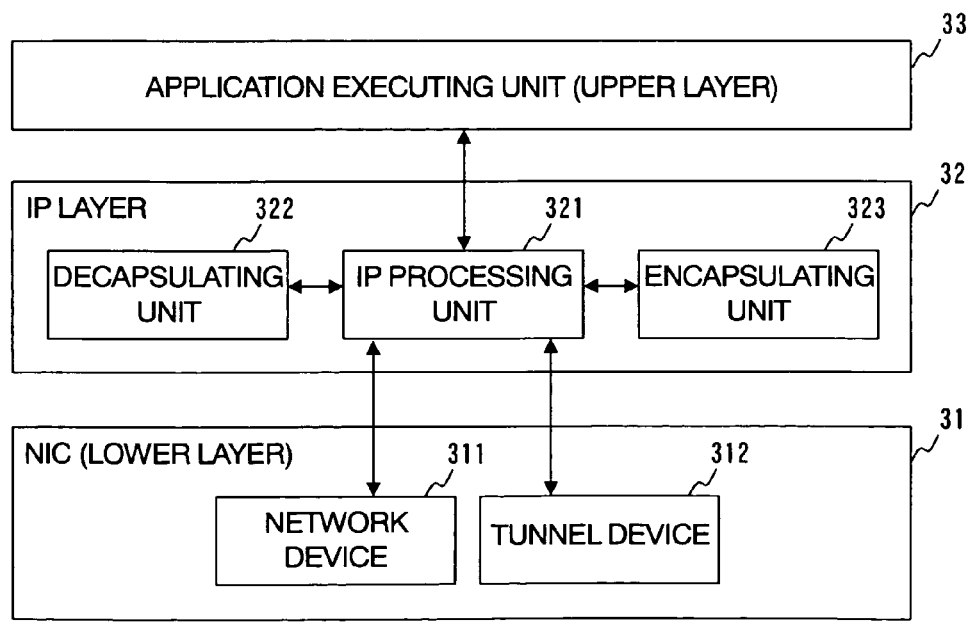
FIG. 5 is a block diagram showing one example of a real node according to the embodiment.

Next, a function of the real node according to this embodiment will be described by using FIG. 5. FIG. 5 is a block diagram showing one example of the function of the real node according to this embodiment. As shown in FIG. 5, the real nodes 3a, 3b and 3c according to this embodiment is mainly composed of, by paying notice to the IP layer in a hierarchical model, an NIC 31 belonging to a lower layer, an IP layer 32 and an application executing unit 33 belonging to the upper layer, NIC 31 includes a network device 311 and a tunnel device 312. The IP layer 32 includes an IP processing unit 321, a decapsulating unit 322 and an encapsulating unit 232.

Then, an operation of the real node according to this embodiment will be described. The application executing unit 33 includes an execution file and executes an application according to the contents of the packet received from the client 5 through the coordinator node 2 to deliver the execution result as the packet to the IP layer. At this time, when the execution result is transmitted to the client 5, a header directed to the client is added to the packet as usual. Alternatively, when communicating with other real node, the VIP header is added to the packet.

The IP processing unit 321 performs filtering or routing of the IP packet inputted from the upper layer or the lower layer, similarly to the conventional IP layer and the IN processing unit 221. The IP processing unit 321 of the present invention further outputs the IP packet to the decapsulating unit 322 when the IP packet having the RIP header is inputted from the lower layer. Also, when the IP packet having the VIP header is inputted from the upper layer, the IP processing unit 321 outputs the IP packet to the encapsulating unit 323.

Figure 3B:
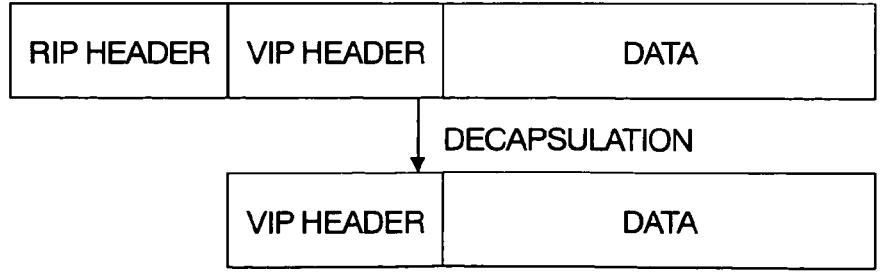

The decapsulating unit 322 removes the RIP header from the IP packet, as shown in FIG. 3(b), when the IP packet having the RIP header is inputted from the IP processing unit 321. At this time, since the encapsulated IP packet is an IP tunneling protocol, the IP packet having the VIP header is outputted to the tunneling device 312 through the IP processing unit 321.

The encapsulating unit 323 retrieves the RIP from the VIP by using the IP management table broadcast from the coordinator node 2 when the IP packet having the VIP header is inputted from the IP processing unit 321 to obtain the RIP of the real node of the destination for actually transmitting the packet. Then, the encapsulating unit 323 encapsulates, as shown in FIG. 3(a), by further adding the RIP header to the IP packet having the VIP header. The encapsulated IP packet is transmitted to the RIP through the IP processing unit 321 and the network device 311.

The network device 311 is similar to the network device 211, and connected to the external client 5 and each node through the network 4. The packet received from the outside is outputted to the IP processing unit 321, and the packet inputted from the IP processing unit 321 is transmitted to the outside.

When the IP packet having the VIP header is inputted from the IP processing unit 321, the tunneling device 312 outputs the IP packet to the IP processing unit 321 directly. Since the destination of the IP packet which is decapsulated is the VIP, the IP packet is received by the tunnel device 312 of the own node, and again inputted to the IP processing unit 321. The IP processing unit 321 outputs the IP packet having the VIP header from the tunnel device 312 to the application executing unit 33.

Here, mounting examples of the IP layer, i.e., the IP processing unit 321, the decapsulating unit 322 and the encapsulating unit 323 will be described. The IP processing unit 321 is realized by using the function of the netfilter in the IP layer of the Linux, similarly to the IP processing unit 321. Furthermore, the operation of the decapsulating unit 322 is registered as the hook function in the NF_IP_LOCAL_IN 73, and the operation of the encapsulating unit 323 is registered as the hook function in the NF_IP_LOCAL_OUT 75. Thus, the decapsulating unit 322 and the encapsulating unit 323 can be realized.

The decapsulating unit 322 and the encapsulating unit 323 can be mounted by applying IP tunneling function. By encapsulating the IP packet in the IP header by IP tunneling, the IP packet can be transmitted to a correct transfer destination irrespective of the packet encapsulated. Here, the protocol of the IP packet to the RIP is set to IPPROTO IPIP.

In the IP tunneling, a response can be returned directly to the request from the client 5 different from the address conversion, such as an NAT (Network Address Translation). As described above, the tunnel device 312 is mounted at all the real nodes 3a, 3b and 3c. The coordinator node 2 and all the real nodes 3a, 3b and 3c have the same IP management table. Therefore, communication by the VIP level can be realized, and communication between the real nodes can be performed.

Figures 6, 7:
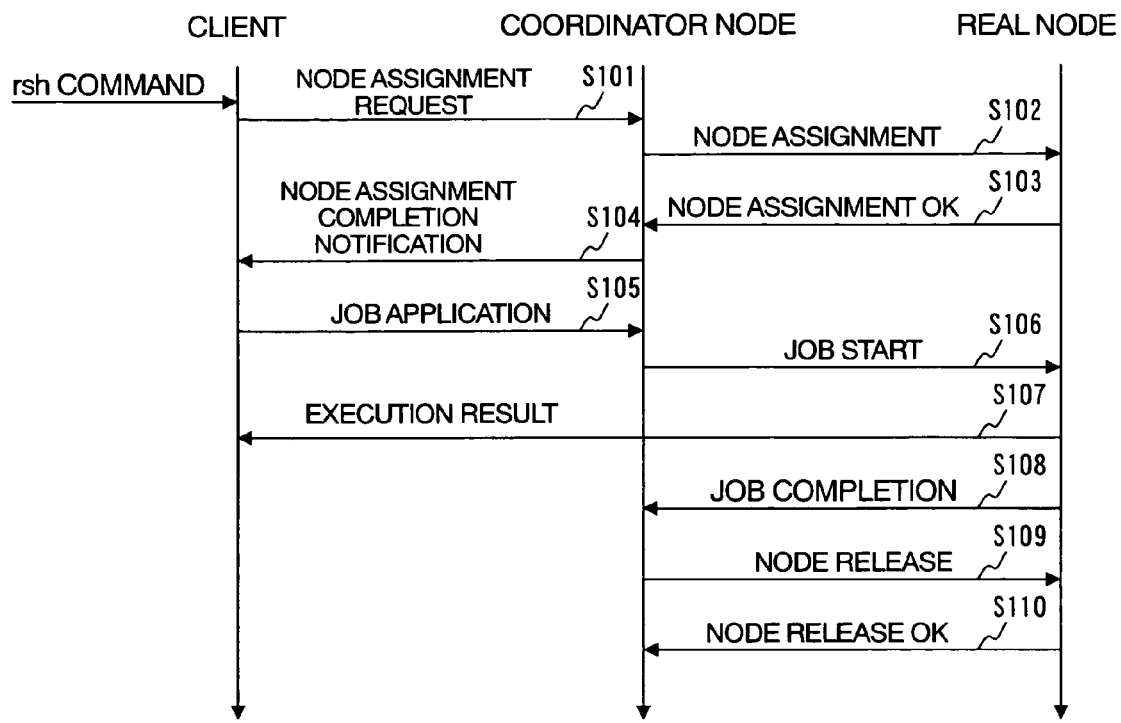
FIG. 6 is a sequence diagram showing one example of an operation in rsh mode of a cluster system according to the embodiment.
FIG. 7 is a view showing one example of an IP management table in the rsh mode.

Then, an operation of the rsh mode will be described with reference to FIG. 6. FIG. 6 is a sequence diagram showing one example of an operation of the rsh mode of a cluster system according to this embodiment. In the rsh mode, an application can be executed in the cluster system 1 by a command "% rsh vnode application [args . . . ]", similarly to the rsh of a general UNIX command. Here, vnode designates a virtual node. Here, for the sake of description, the RIP of the real node 3a is RIP#a, the RIP of the real node 3b is RIP#b, and the RIP of the real node 3c is RIP#c.

First, the user inputs an rsh command by using the client 5, and designates the destination. Here, for example, the VIP#1 is designated as a destination. Thus, a node assignment request is performed (S101). The coordinator node 2 which receives the node assignment request assigns, for example, the RIP#a to the VIP#1 in response to the load state of each real node 3a, 3b and 3c (S102). When the real node 3a is in a state that the application can be executed, the real node 3a returns the information showing the state to the coordinator node 2 (S103). Then, the coordinator node 2 generates the IP management table shown in FIG. 7, broadcasts it to the each real node 3a, 3b, and 3c, and returns a node assignment completion notification showing that the node assignment is succeeded, to the client 5 (S104).

The client 5 which receives the node assignment completion notification, applies a job to the VIP#1 (S105). The job is delivered to the real node 3a through the coordinator node 2 (S106). The real node 3a executes the application of the job and returns the execution result to the client 5 (S107). Also, the real node 3a returns the information that indicates the job is completed to the coordinator node 2 (S108). The coordinator node 2 which has detected the job completion deletes entry of the VIP#1 and the RIP#a of the IP management table, and broadcasts the result to release the node (S109). The real node 3a returns the information showing that the release of the node is confirmed to the coordinator node 2 (S110).

As described above, since the coordinator node 2 allocates the VIP to the RIP in response to the load state, failure, and the like, of the real node. The cluster system of the embodiment can deal flexibly with the change of the load of the node or the failure of the node, and can realize high availability. For example, even when a node failure occurs, the system can be recovered only by automatically changing the assignment of the VIP and the RIP.

Second Embodiment

In the second embodiment, the case that the cluster system of the present invention described with respect to FIG. 1 is used in the HPC mode, will be described. In the HPC mode, executions of a plurality of applications are shared in a plurality of real nodes. Generally, in an HPC type application, communication between nodes is performed. In this embodiment, the coordinator node 2 provides a plurality of virtual nodes for the client 5, and communication is performed between the real nodes, and hence the HPC type application can be operated.

The operation of the HPC mode will be described by using FIG. 8. FIG. 8 is a sequence view showing one example of the operation in the HPC mode of the cluster system according to this embodiment. Here, for the sake of description, the RIP of the real node 3a is RIP#a, the RIP of the real node 3b is RIP#b, and the RIP of the real node 3c is RIP#c.

First, the user designates the destination by using the client 5. Here, for example, the VIP#1 and the VIP#2 are designated as a destinations. Thus, a node assignment request is performed (S201). The coordinator node 2 which receives the node assignment request assigns, for example, the RIP#a to the VIP#1 in response to the load state of each real node 3a, 3b, and 3c (S202). When the real node 3a is in a state that the execution of the application is possible, the real node 3a returns the information showing the state to the coordinator node 2 (S203). Similarly, the coordinator node 2 assigns, for example, the RIP#c to the VIP#2 (S202). The real node 3c, if the execution of the application is possible, returns the information showing the state to the coordinator node 2 (S203). Processes S202 and S203 are repeated for the number of the requested nodes. Then, the coordinator node 2 generates the IP management table shown in FIG. 9, broadcasts it to each node 3a, 3b, and 3c, and returns a node assignment completion notification showing that the node assignment is succeeded to the client 5 (S204).

The client 5 which has received the node assignment completion notification applies the job to the VIP#1 and the VIP#2 (S205). Here, for example, a job that for executing the execution result obtained by the VIP#1 in the VIP#2, is given to the VIP#1 and the VIP#2. The job directed to the VIP#1 is delivered to the real node 3a through the coordinator node 2, and the job directed to the VIP#2 is delivered to the real node 3c through the coordinator node 2(S206). The real node 3a executes the application of the job, and delivers the execution result to the real node 3c. The real node 3c executes the application by using the execution result of the real node 3a, and returns the execution result to the client 5 (S207). Also, the real node 3a and the real node 3c return the information showing that the job is completed to the coordinator node 2 (S208). The coordinator node 2 which has detected the completion of the job, deletes an entry of the VIP#1 and the RIP#a of the IP management table, and an entry of the VIP#2 and the RIP#c, and broadcasts the result to release the node (S209). The real node 3a and the real node 3c return the information showing that the release of the node is confirmed to the coordinator node 2 (S210).

As described above, in the case where the application of the HPC type is operated, even if the real node is faulted, the process which was executed by the faulted real node is automatically allocated to the suitable real node by the coordinator node 2. Therefore, the process can be continued, and the user need not cope with this.

Third Embodiment

In the third embodiment, the case that the cluster system of the present invention is used in WWW mode, will be described. For example, in the case that a large quantity of requests are made from the client to a plurality of servers such as a WWW server, a plurality of RIP are assigned to one VIP, and hence a load in an IP level can be dispersed. Such an operation mode is called WWW mode. In the WWW mode, an execution of one service is shared by a plurality of execution nodes. In this embodiment, the coordinator node 2 assigns one virtual node to a plurality of real nodes, and disperses the requests for the virtual node from the client 5 to a plurality of real nodes. Therefore, a load balance type cluster system can be constructed.

Figure 10:
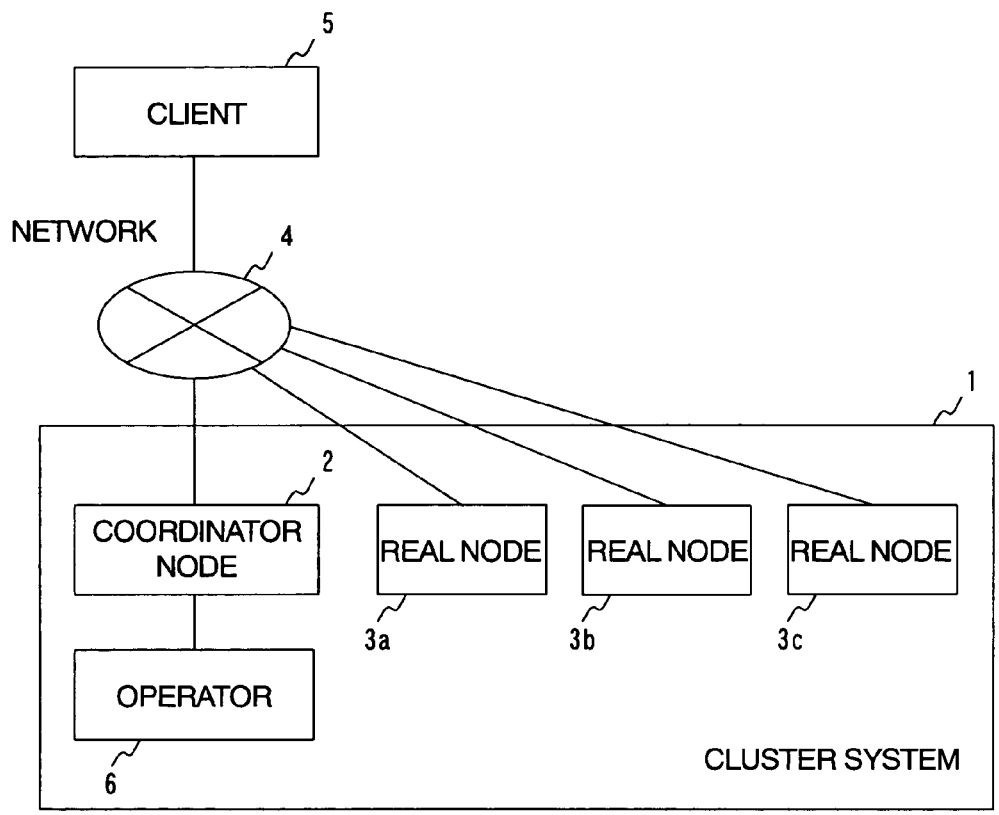
FIG. 10 is a block diagram showing another example of a structure of the cluster system according to the embodiment.

An operation of the WWW mode will be described by using FIG. 10 to FIG. 14. First, the structure of the cluster system according to this embodiment will be described by using FIG. 10. FIG. 10 is a block diagram showing another example of the structure of the cluster system according to this embodiment. In FIG. 10, numeral numbers same as those in FIG. 1 designate similar to subject matters shown in FIG. 1, and the description thereof will be omitted. Since an operator must start and stop the WWW server in the WWW mode, in FIG. 10, an operator 6 is added to the structure shown in FIG. 1. The operator 6 operates the coordinator node 2.

Figure 11:
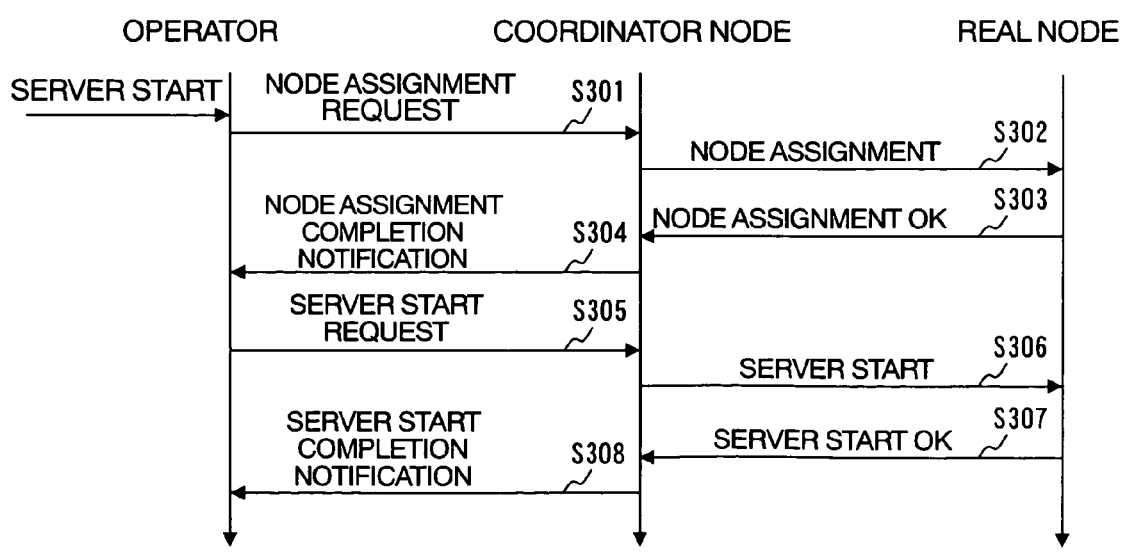
FIG. 11 is a sequence diagram showing one example of an operation of starting a server in WWW mode of the cluster system according to the embodiment.

Then, an operation of starting a server in the WWW mode will be described by using FIG. 11. FIG. 11 is a sequence diagram showing one example of starting a server in the WWW mode of the cluster system according to this embodiment. Here, for the sake of description, the RIP of the real node 3a is RIP#a, the RIP of the real node 3b is RIP#b, and the RIP of the real node 3c is RIP#c.

First, in advance, the operator 6 designates the number of the WWW server to be started. Here, for example, three servers are designated. Then, a node assignment request is performed (S301). The coordinator node 2 which has received the node assignment request assigns, for example, the RIP#a, the RIP#b and the PIP#c to the VIP#1 in response to the load state of each real node 3a, 3b, and 3c (S302). The real nodes 3a, 3b and 3c return, when each real node is in a state that the execution of the service can be performed, the information showing the state to the coordinator node 2 (S303). Then, the coordinator node 2 generates the IP management table shown in FIG. 12, broadcasts it to the real nodes 3a, 3b and 3c, and returns the node assignment completion notification showing that the node assignment is succeeded, to the operator 6 (S304).

The operator 6 which receives the node assignment completion notification performs a server start request (S305). The coordinator node 2 which has received the server start request designates the server start to each real node 3a, 3b and 3c (S306). Each real node 3a, 3b and 3c starts its own node, and returns the information showing the start, to the coordinator node 2 (S307). The coordinator node 2 returns the server start completion notification showing the completion of the server start, to the operator 6 (S308). As described above, by performing the operation of the server start in the WWW mode, the RIP#a, the RIP#b and the RIP#c are assigned to the VIP#1, in advance.

Subsequently, an operation of the service providing time in the WWW mode will be described by using FIG. 13. FIG. 13 is a sequence diagram showing one example of an operation at the service providing time in the WWW mode of the cluster system according to the third embodiment. First, the client 5 applies an HTTP (Hypertext Transfer Protocol) request to the VIP#1 (S401). The request directed to the VIP#1 is allocated to the real node 3a through the coordinator node 2 (S402). The real node 3a returns an HTTP response to the request to the client 5 (S403). Described above are the operation of the service providing time in the WWW mode. Here, the example that the request directed to the VIP#1 is allocated to the real node 3a has been described. However, the packet allocating unit 223 of the coordinator node 2 changes the real node for transferring the request each time it receives a request from the client 5.

Next, the operation of the server stop in the WWW mode will be described by using FIG. 14. FIG. 14 is a sequence diagram showing one example of the operation of the server stop in the WWW mode of the cluster system according to this embodiment.

First, the operator 6 performs the server stop request (S501). The coordinator node 2 which has received the server stop request designates the server stop to each real node 3a, 3b and 3c (S502). Each real node 3a, 3b and 3c stops the own node, and returns the information showing the stop, to the coordinator node 2 (S503). The coordinator node 2 returns the server stop completion notification showing that the server stop is completed, to the operator 6 (S504).

The operator 6 which has received the server stop completion notification performs the node release request (S505). The coordinator node 2 which has received the node release request, deletes an entry of the VIP#1 and the RIP#a, an entry of the VIP#1 and the RIP#b, and an entry of the VIP#1 and the RIP#c of the IP management table, broadcasts the result, and releases the nodes (S506). Each real node 3a, 3b and 3c returns the information showing that the release of the node is confirmed, to the coordinator node 2 (S507). The coordinator node 2 returns the node release completion notification showing that the node release is completed to the operator 6 (S508). As described above, the operation of the server stop in the WWW mode is finished.

As described above, at the service providing time of the WWW mode, even when a large quantity of requests are made from the client 5, the coordinator node 2 can allocate the requests to the suitable real node, in response to the load state, the failure, and the like of the real node.

In the foregoing, the cluster system of the present invention in the first to the third embodiments has been described. However, in the structure of the cluster system of the present invention which has been described with respect to FIG. 3, by creating the IP management table in response to the state of the coordinator mode 2, the three modes consisted of the rsh mode described in the first embodiment, the HPC mode described in the second embodiment, and the WWW mode described in the third embodiment can be switched to any, and operated, or can be combined and operated. Further, since the functions of the virtual node providing unit 222, the packet allocating unit 223 and the coordinator 23 are provided in any of the real nodes, and real node can also be functioned as the coordinator node 2, even if the coordinator node 2 is faulted, the real node can deal with the fault. Thus, further higher reliability can be realized.

INDUSTRIAL APPLICABILITY

As described above in detail, according to the present invention, the coordinator node allocates the VIP to the RIP in response to the load state of the real node, the failure, and the like of the real node, the system can flexibly deal with the change of the nodes without performing change of the node at the client side, and therefore can realize high availability.

The invention claimed is:

1. A computer node that is a physical computer node in a cluster system for providing at least one virtual computer node for a client, comprising:

an IP layer for storing an IP management table of a corresponding table of a virtual IP address that is an IP address of the virtual computer node and a real IP address that is an IP address of the physical computer node, and performing communication using the virtual IP address based on the IP management table;

a network device connected to an other computer node and the client through a network; and an application executing unit for executing an application designated from the client, wherein the IP layer includes:

an encapsulating unit for retrieving a real IP address corresponding to a virtual IP address of a destination by using the IP management table when a first packet added with a first IP header with the virtual IP address as a destination from the application executing unit is inputted, encapsulating to further add a second IP header with the retrieved real IP address as a destination to the first packet, and outputting the obtained second packet to the network device; and a decapsulating unit for generating a fourth packet by removing a third IP header from a third IP packet when the third packet added with the third IP header with the real IP address as a destination from the network device is inputted, and outputting the obtained fourth packet to the application executing unit when the virtual IP address of the fourth IP header with the virtual IP address as a destination is the virtual IP address of its own computer node.

2. The computer node according to claim 1, further comprising:

a tunnel device handled similarly to the network device for outputting the packet with the virtual IP address of its own computer node as a destination to the IP layer.

3. The computer node that is a physical computer node in a cluster system for providing at least one virtual computer node for a client, comprising:

an IP layer for storing an IP management table of a corresponding table of a virtual IP address that is an IP address of the virtual computer node and a real IP address that is an IP address of the physical computer node, and performing communication using the virtual IP address based on the IP management table;

a network device connected to other computer node and the client through a network;

an application executing unit for executing an application designated from the client;

a load state detector for detecting a load state of other computer node;

a node assigning unit for assigning the real IP address to the virtual IP address based on the load state to form the IP management table; and a broadcasting unit for broadcasting the IP management table to other computer node, wherein the IP layer includes:

a virtual node providing unit for providing the virtual IP address to the client; and a packet allocating unit for retrieving the real IP address from the virtual IP address by using the IP management table when the packet with the virtual IP address as a destination is inputted from the network device, and outputting the packet with the retrieved real IP address as a destination to the network device, wherein the packet allocating unit further encapsulates the second IP header with the retrieved real IP address as a destination to the first packet when the first packet added with the first IP header with the virtual IP address as a destination is inputted from the network device, and outputs the obtained second packet to the network device.

4. The computer node according to claim 3, wherein the virtual node providing unit assigns at least one IP address different from the real IP address to the network device.

5. The computer node according to claim claim 3, wherein the node assigning unit assigns a plurality of real IP addresses to one virtual IP address.

6. The computer node according to claim 5, wherein the node allocating unit changes the real IP address for transferring the request each time the one virtual IP address receives a request from the client.

7. The computer node according to claim claim 3, wherein the broadcasting unit broadcasts only changed entry of the IP management table to an other computer node.

8. The computer node according to claim 3, wherein the broadcasting unit transmits only the entry requested from the other computer node of the IP management table only to the other computer node.

* * * * *